United States Patent [19]
Channell

[11] 3,848,074
[45] Nov. 12, 1974

[54] TERMINAL AND SPLICE ENCLOSURE FOR CABLE INSTALLATIONS

[76] Inventor: William H. Channell, 122 Oak Tree Dr., Glendora, Calif. 91740

[22] Filed: Apr. 13, 1973

[21] Appl. No.: 351,106

[52] U.S. Cl. .................. 174/38, 174/77 R, 174/87, 277/9, 277/189, 277/DIG. 10
[51] Int. Cl. .......................... H02g 9/02, F16j 15/10
[58] Field of Search ......... 174/37, 38, 44, 60, 65 G, 174/65 SS, 77 R, 81, 82–87, 93, 152 G, 153 G; 277/12, 115, 166, 188, 189, 198, 216

[56] References Cited
UNITED STATES PATENTS

| | | | |
|---|---|---|---|
| 3,435,124 | 3/1969 | Channell | 174/38 |
| 3,449,507 | 6/1969 | Channell | 174/77 R X |
| 3,557,299 | 1/1971 | Dienes | 174/38 |
| 3,710,003 | 1/1973 | Channell | 174/77 R X |

FOREIGN PATENTS OR APPLICATIONS

| | | | |
|---|---|---|---|
| 519,709 | 11/1953 | Belgium | 174/60 |
| 621,632 | 12/1962 | Belgium | 174/153 G |
| 1,307,295 | 9/1962 | France | 174/153 G |
| 890,206 | 9/1953 | Germany | 174/60 |
| 390,341 | 7/1965 | Switzerland | 174/65 SS |

*Primary Examiner*—Laramie E. Askin
*Attorney, Agent, or Firm*—Christie, Parker & Hale

[57] ABSTRACT

A terminal and splice enclosure for cables, including an annular terminal base on which is threaded a cover. A resilient sealing and locking band secures the cover on the base. The base has a tapered opening which receives a tapered grommet of resilient material, the grommet having variable size holes through which the cables pass in sealed relationship. The grommet is formed with a plurality of circular concentric slits which do not extend completely through the grommit. A transverse slit extending completely through the grommet provides access to the concentric slits for selectively cutting one of the concentric slits completely through and removing the center material to provide the required hole size for the cable.

4 Claims, 9 Drawing Figures

3,848,074

TERMINAL AND SPLICE ENCLOSURE FOR CABLE INSTALLATIONS

FIELD OF THE INVENTION

This invention relates to cable terminal and splice enclosures, and more specifically, relates to a sealed enclosure for telephone cable splices and service line junctions.

BACKGROUND OF THE INVENTION

With the increased use of underground cable for telephone and other types of communication systems, it is desirable to provide an enclosure for cable splices and service line junctions which gives complete protection against moisture, corrosion, and other adverse environmental conditions. At the same time, the enclosure should be inexpensive to manufacture and to install without special tools. At the same time, the enclosure must be readily removable to provide access to the internal connections, either for repairing or replacing cable sections or changing or removing service line connections.

SUMMARY OF THE PRESENT INVENTION

The present invention provides an enclosure which provides complete sealing against moisture, and the like, into the enclosure or against the escape of gas from the interior of the enclosure when used with pressurized cable, for example. The enclosure is capable of accommodating a number of cable sizes as well as different numbers of service line connections. The enclosure can be installed in the field without the need for special tools. Although providing complete sealing against moisture, even to the extent of fully immersing the enclosure under water under a considerable head of pressure, the enclosure can be easily opened to regain access to the cable splice and service line connections within the enclosure. A special grommet construction permits sealing of cables of different diameters using only a single standard grommet.

These and other advantages of the present invention are achieved, in brief, by providing an enclosure which includes an annular base on which is removably threaded a cover. The cover and base are formed with cooperating radially projecting lips over which a flexible resilient band or sealing ring fits to lock the cover to the base and seal the interface. The cables extend through a grommet which is inserted in the annular opening of the base during installation, the grommet being tapered so as to be wedged into a state of compression by insertion in the base. For each cable to be inserted through the grommet there is provided a group of precut circular concentric slits which extend substantially but not completely through the grommet. A slit in the grommet extending transverse to the concentric slits allows the grommet to be spread apart, giving access to the concentric slits for cutting a selected one of the slits completely through the grommet material. The cut allows the material within the concentric slit to be removed, forming a hole of desired size through the grommet to receive the cable.

BRIEF DESCRIPTION OF THE DRAWINGS

For a more complete understanding of the invention, reference should be made to the accompanying drawings, wherein.

DETAILED DESCRIPTION

Figures 1, 2, 8, 9:
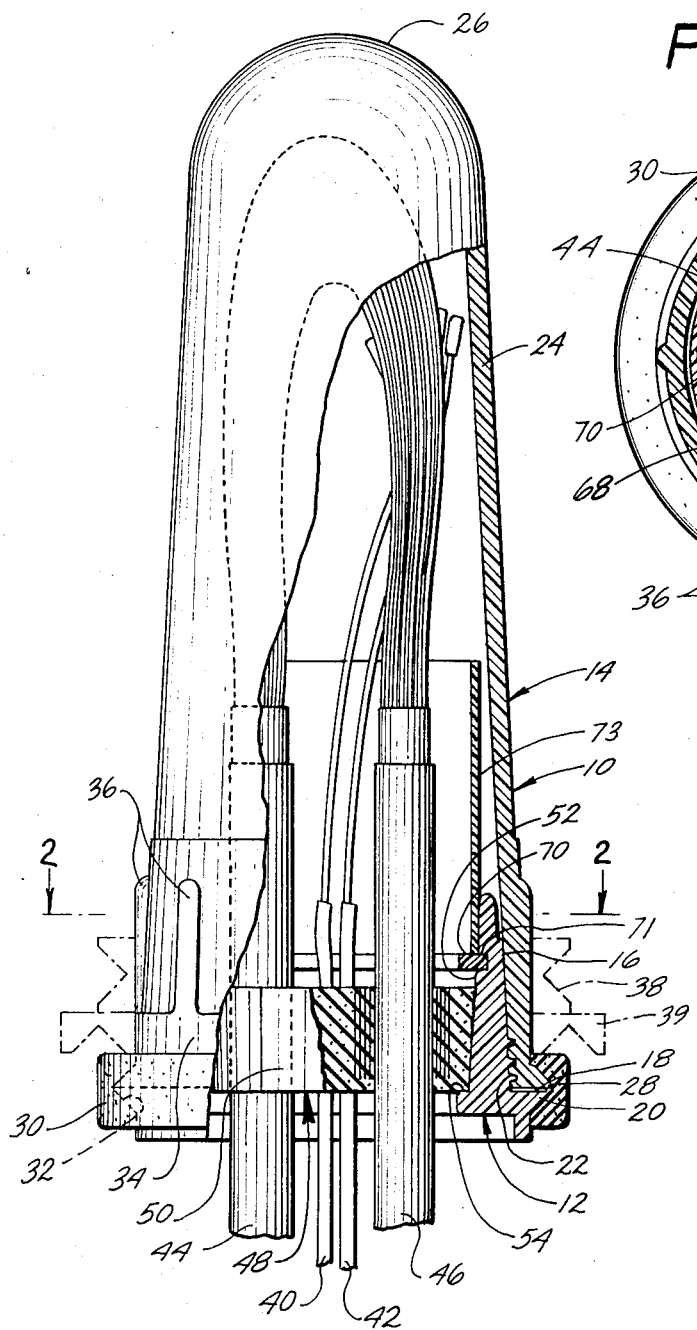
FIG. 1 is a side view partly in section of a cable enclosure assembly according to the present invention.
FIG. 2 is a cross-sectional view taken substantially on the line 2—2 of FIG. 1.
FIG. 8 is a detailed plan view of an alternative grommet for a single cable.
FIG. 9 is a sectional view taken on the line 9—9 of FIG. 8.

Referring to the drawings in detail, the numeral 10 indicates generally a cable splice enclosure assembly including an annular terminal base 12 and cover on housing 14. The base 12 is molded of a rigid plastic material, such as a phenolic resin, or the like. The base 12 is formed with a slightly tapered outer surface 16 which terminates at its larger diameter end in a shoulder 18 formed by a beveled lip 20. Non-binding threads 22 are integrally formed on the outer surface 16.

The cover 14 has a tapered side wall 24 which terminates in a domed end wall 26, the side wall 24 and end wall 26 being integrally molded as a single piece of rigid plastic material. The inner surface of the tapered side wall 24 at the open end of the cover engages the surface 16 of the base 12. The interior of the side wall 24 is provided with matching threads by which the cover 14 is screwed onto the base 12. The open end of the cover 14 is formed with a beveled projecting lip 28 forming a shoulder which is in abutting relation with the shoulder 18 when the cover 14 is threaded in place.

To lock the cover in place after it is threaded onto the base 12 and at the same time to seal the interface between the abutting lips 20 and 28, an annular band or sealing ring 30 is provided. The band 30 is made of elastic flexible material such as rubber, neoprene, or the like, which is molded with a V-shaped annular groove 32 around the inner periphery. When in sealing position, the groove 32 fits over the tapered projecting lips 20 and 28 of the base 12 and cover 14. The band 30 is stretched when in sealing position, the resilience of the material causing it to contract firmly and tightly against the tapered surfaces of the abutting lips, thereby locking the cover in place and sealing the abutting interface between the base and the cover.

The outside of the cover 14 is formed with a substantially cylindrical surface 34 adjacent the lip 28. The surface 34 is extended by a plurality of ribs 36 forming guide means for installation of the annular sealing band 30 lying in an axial direction on the outside of the cover 14. The band 30 is initially turned inside out so that the groove 32 is on the outside of the band. The annular band is then slipped over the cover end 26 and onto the ribs 36 into the position indicated at 38. After the cover 14 is threaded onto the base 12, the band 30 is rolled into sealing position along the ribs 36. In rolling the band, it is returned through the intermediate position indicated at 39 into the final sealed position with the groove back on the inside of the band. This arrangement provides an effective way in which to stretch the band, placing it under considerable tension and still making it easy to move the band into sealing position without the need of any tools to expand or stretch the band.

All service lines, two of which are indicated at 40 and 42, and telephone cables, two of which are indicated at 44 and 46, are brought into the enclosure through a grommet 48. The circular grommet is formed with a tapered outer surface 50 which is forced into a tapered interior opening 52 in the base 12. The grommet 48 seats on a shoulder 54 at the small diameter end of the opening. The grommet 48 is seated in the base 12 after the cables and service lines are inserted through the grommet in a manner hereinafter described in more detail.

The grommet 48 is constructed from a resilient flexible material, such as rubber or neoprene. The material should be fairly soft and compressible even at relatively cold ambient temperatures, such as encountered in the winter time in the northern climates. Preferably the material has a Shore constant in the 30 to 35 range.

Figure 3:
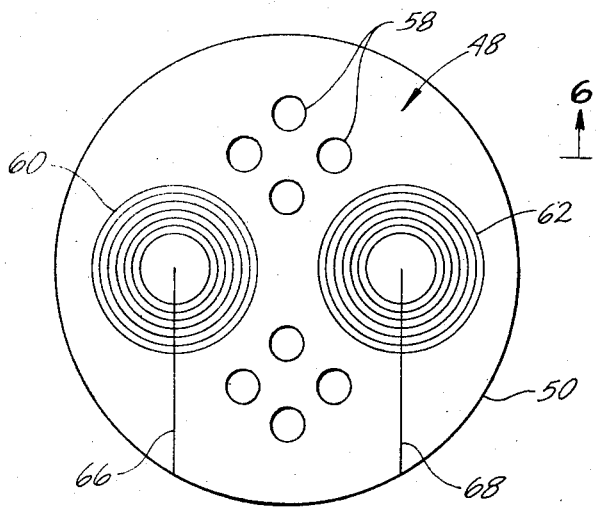
FIG. 3 is a detailed plan view of the sealing grommet through which the cables pass into the interior of the enclosure.
Figure 4:
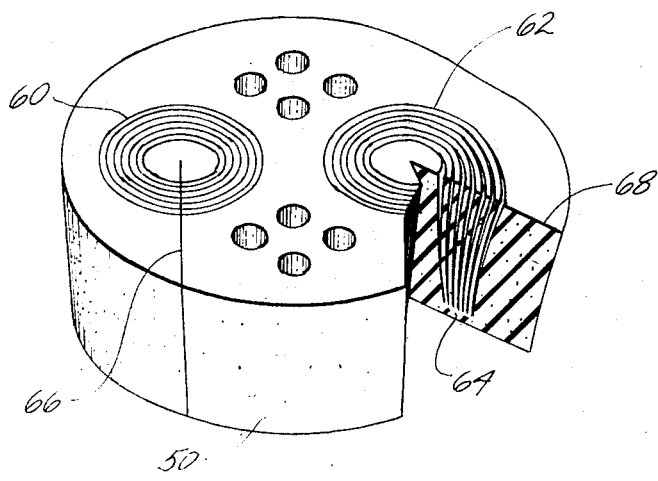
FIG. 4 is a perspective view of the grommet of FIG. 3.
Figure 7:
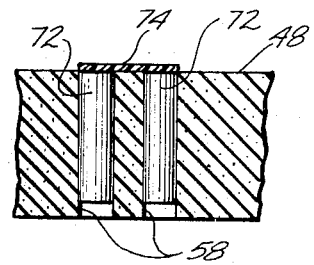
FIG. 7 is a partial sectional view taken on the line 7—7 of FIG. 2.

As best seen in FIGS. 3 and 4, the grommet is provided with eight small holes 58 which are preferably arranged into groups of four. These holes are for receiving the service lines, such as indicated at 40 and 42. To provide openings for the larger cables 44 and 46, the grommet is pre-cut with two groups of concentric slits, indicated at 60 and 62. As shown, there are seven concentric slits which vary in diameter, for example, in increments of .100" from .500" through 1.100" for each group. The slits penetrate the grommet substantially but not completely through the one end wall, leaving a thin uncut region of material 64 which holds the concentric layers together in place. Transverse slits 66 and 68 are provided, respectively, for each of the concentric groups of slits 60 and 62. The transverse slits extend from the outer periphery 50 to the axial center of the respective groups of circular slits and extend completely through the opposite end surfaces of the grommet.

The margins of the transverse slits can be spread apart by hand, exposing the edges of the concentric slits and the continuous layer 64 by which the concentric layers are held in place. During installation, once the diameters of the cables 44 and 46, which are to pass through the grommet, are known, a selected one of the concentric slits can be cut through the connecting layer 64 so as to provide a hole through the grommet of the correct size to receive the cable. Once one of the concentric slits is cut through, all the material inside the slit can be pushed out leaving a hole of the required size. Thus a universal grommet is provided which can be made to readily accommodate cables of different diameters by the installer.

After the openings are formed for the cables, the cables are slipped into the openings through the transverse slits 66 and 68 and the grommet with the cables and service lines in place is then wedged into place in the base 12. This is accomplished by first lubricating the tapered outer periphery 50 of the grommet and mating surface 52 of the base 12 with a suitable lubricating grease. The lubricating grease must also be selected so as to provide good lubricating qualities at relatively low ambient temperatures. A suitable grease for this purpose has been found to be a product of Standard Oil of California, sold under the name CHEVRON Aviation Grease No. 33.

When the grommet is fully seated in the base 12 against the shoulder 54, the grommet material is compressed firmly around the cables and service lines. The compression of the grommet material also provides a sealing action at the interface between the transverse slits 66 and 68, between the remaining concentric layers formed by the concentric slits surrounding each of the cables and the interface between the grommet material and the cables and service lines. The grommet is locked in place by a plastic snap ring 70 which engages a groove 71. Around the inner periphery of the base 12 a cylindrical shield 73 may be inserted within the base above the snap ring 70 to protect the ends of the cable sheathing when the cover 14 is removed.

Figure 5:
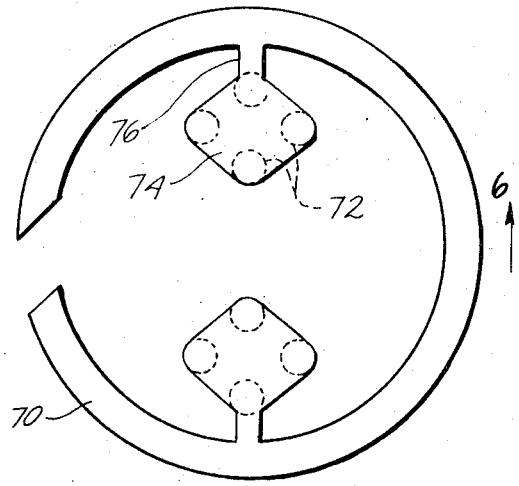
FIG. 5 is a plan view of a retaining ring assembly.
Figure 6:
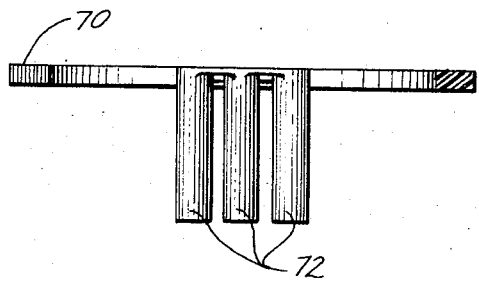
FIG. 6 is a sectional view taken on the line 6—6 of FIG. 5.

Since not all eight of the holes 58 may be used for service lines in a given installation, it is necessary to plug the unused holes. For this purpose, plastic plugs are preferably integrally molded with the snap ring 70 in the manner shown in FIGS. 5 and 6. Two groups of four plugs, indicated at 72, are provided. Each group of plugs is joined at one end by a thin membrane 74 which is integrally molded with and connected to the inside of the snap ring by a supporting portion 76. At the time of installation, these groups of plugs are removed from the snap ring 70 by breaking the bridging portion 76. Each group of plugs can then be arranged to provide anywhere from one to four plugs by breaking off the unneeded plugs and inserting the remaining group of plugs into the unused holes 58. As shown in FIG. 2, one complete group of four plugs is used to plug one group of holes and two plugs are used to plug two of the remaining group of holes, since only two of the holes are used for service lines in the example shown in the figures.

FIGS. 8 and 9 show a grommet arranged to provide a single cable opening, such as may be used where the cable terminates within the enclosure or where the grommet is used on only one end of a coaxial type of enclosure and a single cable passes through opposite ends of the enclosure. A grommet 80 is provided with a group of concentric slits 82 which are cut in the grommet material to a depth slightly less than the thickness of the grommet, leaving a connecting layer 84 at the bottom of the slits. A transverse slit 86 extends radially from the outer circumference of the grommet to the center of the group of concentric slits 82. By spreading the material of the grommet on the transverse slit 86, the edges of the concentric slits can be exposed permitting a knife, scissors, or other sharp instrument to be inserted in one of the concentric slits and the layer 84 cut through to permit an opening of the required diameter to be formed in the grommet. By this arrangement the universal grommet is provided which can be made to accommodate a variety of cable sizes.

From the above description, it will be recognized that a cable splice enclosure is provided which can be easily installed in the field without the need for any special tools. A knife, scissors, or wire cutters, which are the standard tools of a cable installer, is all that is needed to make the enclosure fit a wide range of cable sizes. A sealed cover is readily installed and easily sealed against moisture by the band or sealing ring. The unique construction and arrangement by which the band is installed allows the band to both seal and to lock the cover in place. At the same time, the band can be easily removed by hand by rolling it back off the abutting lips, permitting the cover to be unscrewed. By virtue of the non-jamming threads, the cover can be unscrewed by hand regardless of how tightly the cover has been applied. The pliable grommet with its concentric slits for providing a wide range of opening sizes for the associated cables, provides an easily installed assembly. At the same time, the grommet sealing arrangement is capable of withstanding substantial pressure gradients, the entire enclosure being capable, for example, of being immersed in as much as 55 feet of water with no leakage of the water into the interior of the enclosure.

What is claimed is:

1. A cable terminal and splice enclosure comprising a housing having an opening, a terminal base removably secured in the opening in the housing, the terminal base having an elongated opening therethrough, a flexible grommet having openings therethrough for receiving the cables to be spliced, the grommet being seated in said elongated opening in the terminal base, locking means retaining the grommet in the elongated opening, and a flexible sealing ring, the housing having a lip around the opening therein and the base having a cooperating lip engaging the lip on the housing, the flexible sealing ring having a groove receiving the lip of the housing and lip of the base and thereby retaining the base in position and sealing the connection between the base and the housing.

2. The apparatus of claim 1 wherein the elongated opening is tapered and the grommet is tapered so that the grommet is compressed by the wedging action of the tapered opening when the grommet is inserted in place.

3. The apparatus of claim 1 wherein the housing includes guide means surrounding the opening adjacent the lip of the housing, the sealing ring being annular in shape and sufficiently flexible to be turned inside out so that the groove is around the outer periphery, the ring being initially positioned on the outer surface turned inside out in engagement with the guide means, rolling of the ring along the guide means turning the ring outside in so that the groove snaps over said cooperating lips as the ring twists into place.

4. Apparatus of claim 1 wherein the grommet has a plurality of circular concentric slits extending substantially but not completely through the grommet in a direction of the axis of the circular slits, and a slit extending radially of the concentric slits out to the outer periphery of the grommet, the radially extending slit extending completely through the grommet in the direction of the axis of the circular slits.

* * * * *